(12) United States Patent
Aist et al.

(10) Patent No.: US 9,683,863 B2
(45) Date of Patent: Jun. 20, 2017

(54) NAVIGATION SYSTEM WITH STATE GENERATION MECHANISM AND METHOD OF OPERATION THEREOF

(71) Applicant: Telenav, Inc., Sunnyvale, CA (US)

(72) Inventors: Gregory Stewart Aist, San Mateo, CA (US); Weiying Li, Curpertino, CA (US); Rajeev Agarwal, Fremont, CA (US); Aliasgar Mumtaz Husain, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/025,092

(22) Filed: Sep. 12, 2013

(65) Prior Publication Data

US 2014/0188380 A1    Jul. 3, 2014

Related U.S. Application Data

(60) Provisional application No. 61/748,745, filed on Jan. 3, 2013.

(51) Int. Cl.
*G06C 21/00*    (2006.01)
*G01C 21/36*    (2006.01)

(52) U.S. Cl.
CPC ................... *G01C 21/3667* (2013.01)

(58) Field of Classification Search
CPC ................................... G01C 21/3626
USPC ........................................... 701/400
See application file for complete search history.

(56) References Cited

U.S. PATENT DOCUMENTS

| 6,728,635 | B2 * | 4/2004 | Sakamoto et al. . | G01C 21/3644 701/431 |
|---|---|---|---|---|
| 8,201,140 | B2 | 6/2012 | Raghavan et al. | |
| 2009/0182492 | A1 * | 7/2009 | Alten | 701/200 |
| 2013/0326365 | A1 * | 12/2013 | Rudenstine et al. | 715/751 |

* cited by examiner

*Primary Examiner* — Maceeh Anwari
(74) *Attorney, Agent, or Firm* — IP Investment Law Group

(57) ABSTRACT

A method of operation of a navigation system includes: determining a travel context based on a route condition for providing a navigation guidance; generating a state node having a state content with a control unit based on the travel context; and generating a guidance process based on the state node for presenting a prompt on a device.

20 Claims, 7 Drawing Sheets

NAVIGATION SYSTEM WITH STATE GENERATION MECHANISM AND METHOD OF OPERATION THEREOF

TECHNICAL FIELD

The present invention relates generally to a navigation system, and more particularly to a system with state generation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without state generation mechanism to adjust the state according to the circumstance has become a paramount concern for the consumer. The inability decreases the benefit of using the tool.

Thus, a need still remains for a navigation system with state generation mechanism to adjust the state according to the circumstance. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel context based on a route condition for providing a navigation guidance; generating a state node having a state content with a control unit based on the travel context; and generating a guidance process based on the state node for presenting a prompt on a device.

The present invention provides a navigation system, including: a context module for determining a travel context based on a route condition for providing a navigation guidance; a node module, coupled to the context module, for generating a state node having a state content with a control unit based on the travel context; and a topology module, coupled to the node module, for generating a guidance process based on the state node for presenting a prompt on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
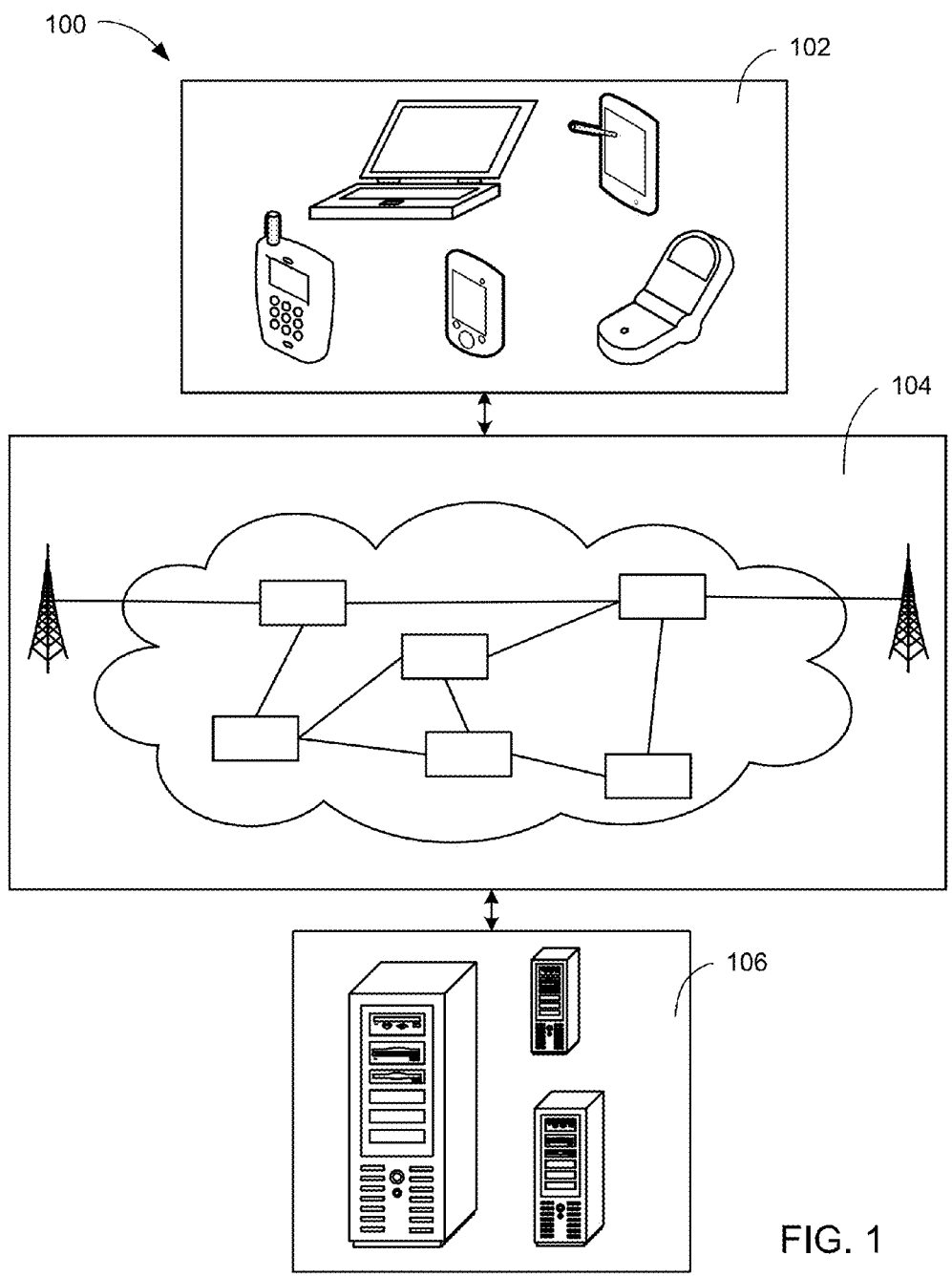
FIG. 1 is a navigation system with state generation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with state generation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
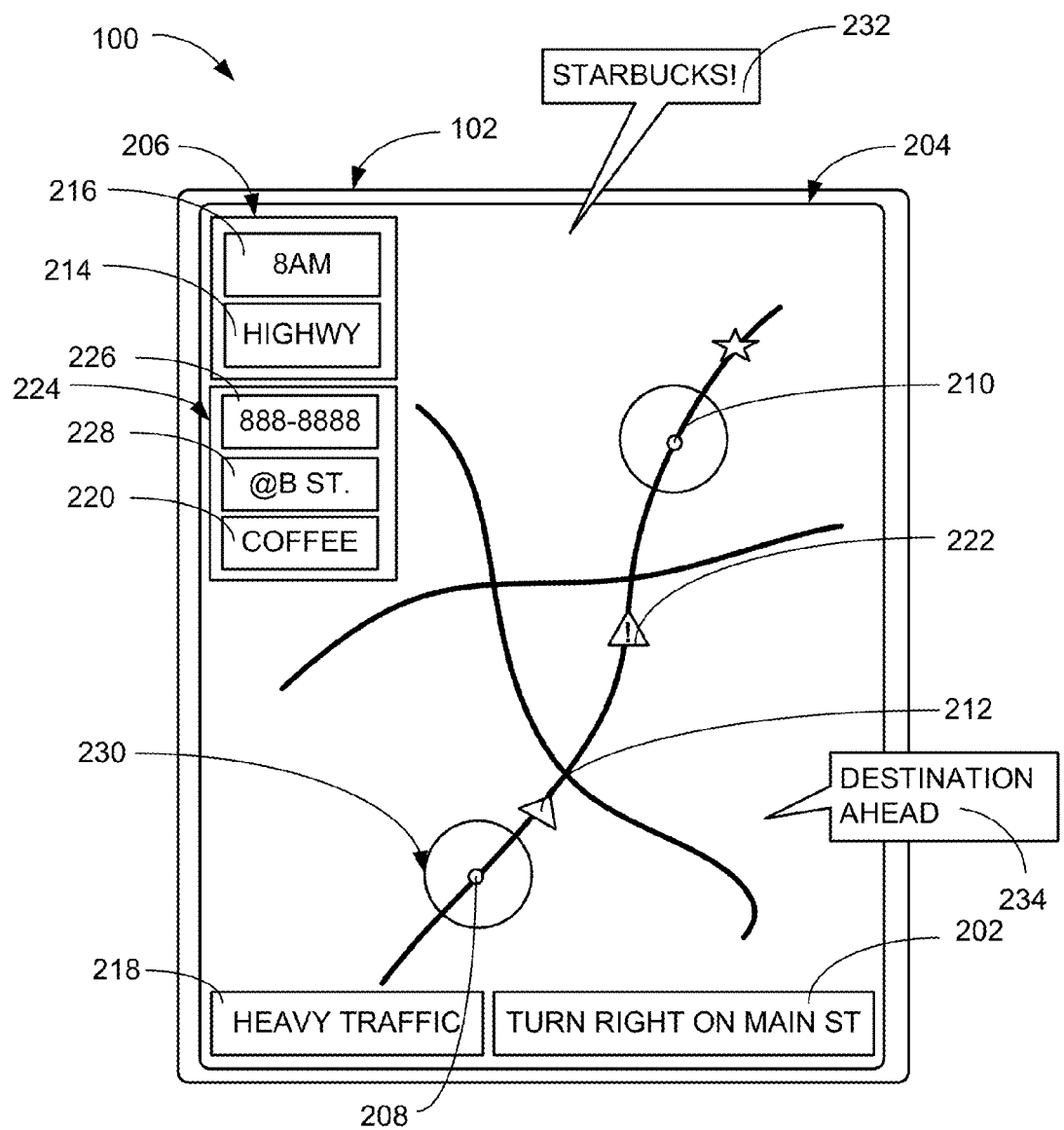
FIG. 2 is an example of a display interface of first device presenting a navigation guidance.

Referring now to FIG. 2, there is shown an example of a display interface of first device 102 presenting a navigation guidance 202. For clarity and brevity, the discussion of the embodiment of the present invention will focus on the first device 102 delivering the result generated by the navigation system 100. However, the second device 106 of FIG. 1 and the first device 102 can be discussed interchangeably.

The navigation guidance 202 is defined as information to guide user's travel. For example, the navigation guidance 202 can represent a turn by turn direction. For further example, the navigation system 100 can display the navigation guidance 202 for a travel context 204. The travel context 204 is defined as a situation, circumstance, or a combination thereof surrounding the first device 102. For example, the travel context 204 can be determined based on a route condition 206.

For example, the route condition 206 can include a start location 208 where the travel started from, a destination 210 of where the travel will end, a geographic location 212, a route type 214 where the user is traveling, a traveling time 216, or a combination thereof. For another example, the route condition 206 can include a traffic condition 218 for the route type 214, the geographic location 212, the destination 210, the start location 208, or a combination thereof. More specifically, the traffic condition 218 can represent amount of traffic on the road, accident on the road, or a combination thereof. The navigation guidance 202 can present the route condition 206 on the first device 102.

The geographic location 212 can represent user's physical location. The traveling time 216 can represent a time of day, week, month, year, or a combination thereof when user is traveling. A route type 214 is defined as categorization of a path for travel. For example, the route type 214 can represent local road, expressway, freeway, or a combination thereof. A category of interest 220 is defined as a classification of a point of interest 222. The destination 210 can represent the point of interest 222. For example, the point of interest 222 can represent a coffee shop. The category of interest 220 for the point of interest 222 can represent food and dining. The point of interest 222 can also represent the geographic location 212 where the user is currently at or the destination 210 the user is travelling to.

The point of interest 222 can include POI information 224, such as contact information 226, location information 228, the category of interest 220, or a combination thereof. The contact information 226 can represent phone number, email address, website address, or a combination thereof of the point of interest 222. The location information 228 can represent the address information, the longitudinal and latitudinal information, or a combination thereof of the point of interest 222. The navigation guidance 202 can present the point of interest 222 and the POI information 224.

A predefined vicinity 230 is defined as a boundary surrounding the geographic location 212. For example, the predefined vicinity 230 can represent the boundary surrounding the user's current location, the start location 208, the destination 210, the point of interest 222, or a combination thereof. Moreover, a shape of the predefined vicinity 230 surrounding the point of interest 222 can represent a polygon, a circle, or a combination thereof.

A command input 232 is defined as an entry to the navigation system 100. For example, the command input 232 can represent a voice entry by the user of the navigation system 100 to request for a travel route from the start location 208 to the destination 210. A prompt 234 is defined as a presentation of navigation information by the navigation system 100. For example, the prompt 234 can display the navigation guidance 202 from the start location 208 to the destination 210 displayed on the display interface of the first device 102.

Figure 3:
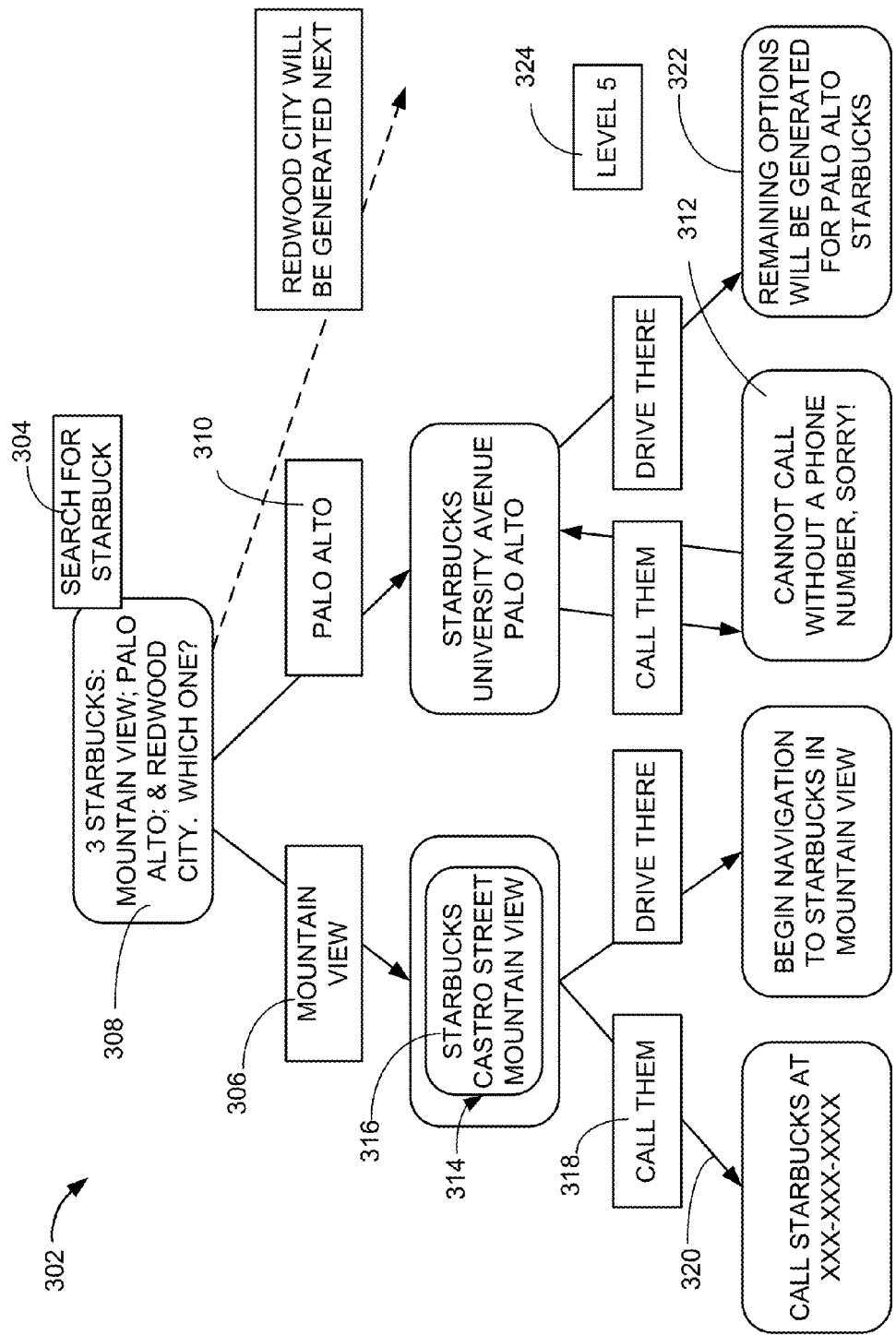
FIG. 3 is an example of a state diagram for the navigation system.

Referring now to FIG. 3, therein is shown an example of a state diagram for the navigation system 100 of FIG. 1. A guidance process 302 is defined as a state machine. The guidance process 302 can represent the finite-state machine. A guidance type 304 is defined as a category of the guidance process 302. The guidance process 302 can represent the state machine for providing the navigation guidance 202 of FIG. 2, providing information related to the point of interest 222 of FIG. 2, or a combination thereof. More specifically, the guidance process 302 can represent a dialogue process or an interactive process between the user and the navigation system 100.

The guidance process 302 can include a state node 306, which is defined as an instance of a state for the state machine. The state node 306 can include an entry node 308, which is defined as the first instance of the state node 306 for the guidance process 302. A dialog node 310 is defined as the subsequent instance of the state node 306 following the entry node 308. A fallback node 312 is defined as an error handling instance of the state node 306.

The state node 306 can include a state characteristic 314, which is defined as an attribute of the state node 306. For example, the state characteristic 314 can include a state content 316, which is defined as a value of the state node 306. For another example, the state characteristic 314 can include an action type 318, which is defined as an option available for the state node 306 to invoke an instance of the state node 306. For example, the invocation of the instance of the state node 306 can represent a subsequent instance of the state node 306 or invoking a same instance of the state node 306. An arc 320 can represent the output from one instance of the state node 306 to proceed to another or the same instance of the state node 306. Further, the arc 320 can represent the action type 318 available for the state, thus, directing the sequence of transitioning from one instance of the state node 306 to another instance of the state node 306 in the guidance process 302.

A state template 322 is defined as a topology or the state diagram of the guidance process 302. The topology can represent the end-to-end framework of the guidance process 302. The end-to-end framework can represent disclosing the entire logical sequence of the guidance process 302. A template size 324 can represent the number of levels establishing the hierarchical relationship for the state template 322.

As illustrated in FIG. 3, the entry node 308 can have the state content 316 providing the options to choose Starbucks Coffee™ from the cities of Mountain View, Palo Alto, and Redwood City in Calif. If the user of the navigation system 100 selects Mountain View, the navigation system 100 can generate the dialog node 310 with the state content 316 with the contact information 226 of FIG. 2, the location information 228 of FIG. 2, or a combination thereof. And based on the state content 316, the navigation system 100 can provide the action type 318, for example, "call them," "drive there," or a combination thereof.

Figure 4:
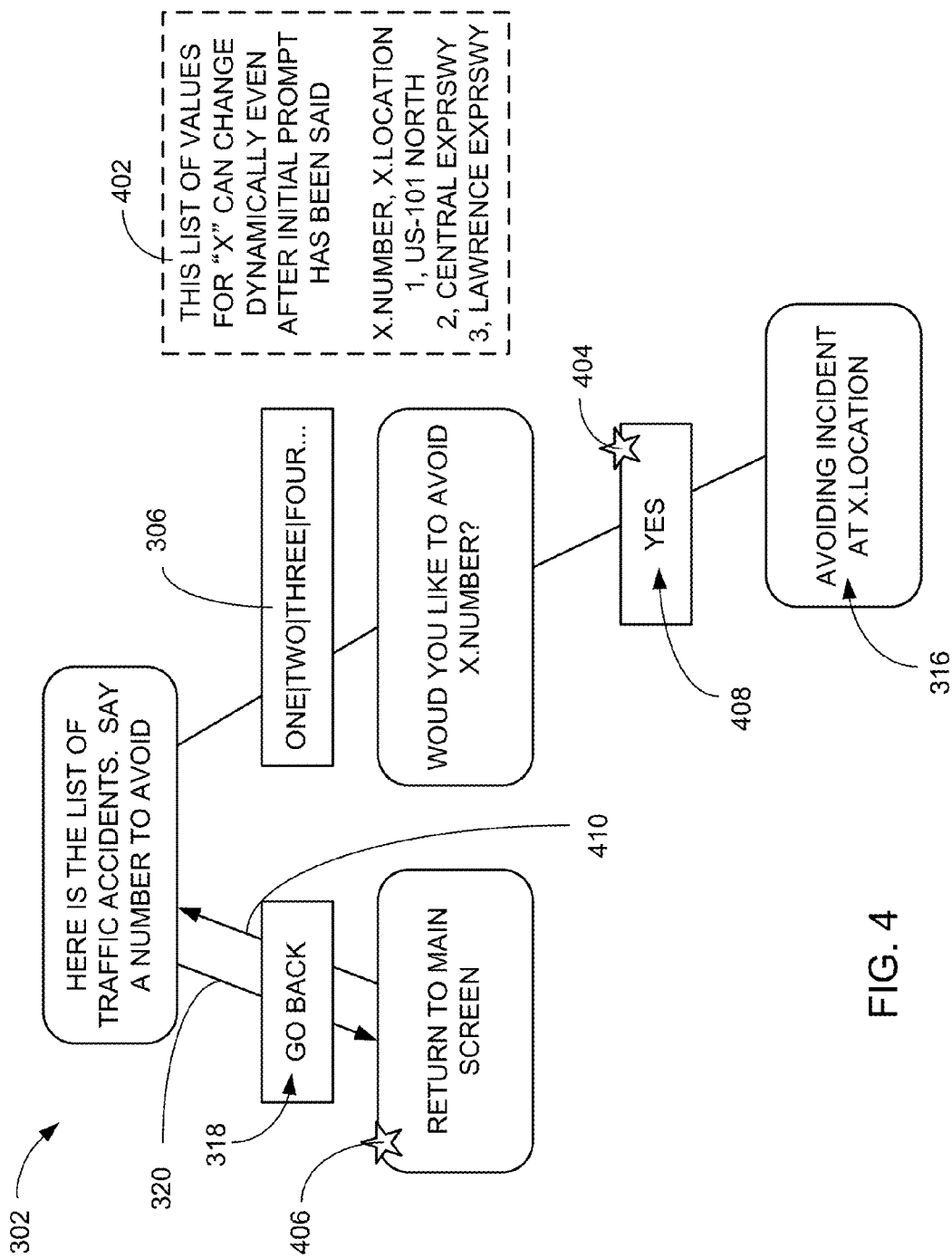
FIG. 4 is an example of a state diagram having an indefinite size.

Referring now to FIG. 4, therein is shown an example of a state diagram having an indefinite size. More specifically, the guidance process 302 can represent a state machine that is dynamically adaptive in size, thus, not a finite-state machine. For example, the navigation system 100 can adjust size of the guidance process 302 based on the travel context 204 of FIG. 2. For a specific example, if the travel context 204 represents no traffic congestion, the navigation system 100 can provide a topology of three levels for the end-to-end framework for the guidance process 302. In contrast, if the travel context 204 represents traffic congestion, the navigation system 100 can provide a topology of five levels for the end-to-end framework for the guidance process 302. By having more levels, the navigation system 100 can provide the guidance process 302 with additional instances of the state node 306 to provide more instances of the action type 318.

A packed option 402 is defined as a quantified element describing how to generate the arc 320 and the state node 306 for the guidance process 302. Moreover, the packed option 402 can include the state content 316 for generating the state node 306. Details regarding the generating the guidance process 302 with an indefinite size will be discussed below.

The efficacy of the guidance process 302 can be tested by a runtime validation 404, a runtime verification 406, a formal verification 408, or a combination thereof. The runtime validation 404 can represent the checking of whether the guidance process 302 can execute the action type 318 available for the state node 306. The runtime verification 406 can represent checking of the availability of a backup arc 410. The backup arc 410 can represent the action type 318 that can be executed if the navigation system 100 of FIG. 2 misunderstands the command input 232 of FIG. 2.

The formal verification 408 can represent the checking of the integrity of the guidance process 302. The integrity of the guidance process 302 can represent the availability, the reachability, or a combination thereof of the state node 306 as specified in the state template 322 of FIG. 3 or the state node 306 having the values, such as the action type 318, as specified in the state template 322, the packed option 402, or a combination thereof.

Figure 5:
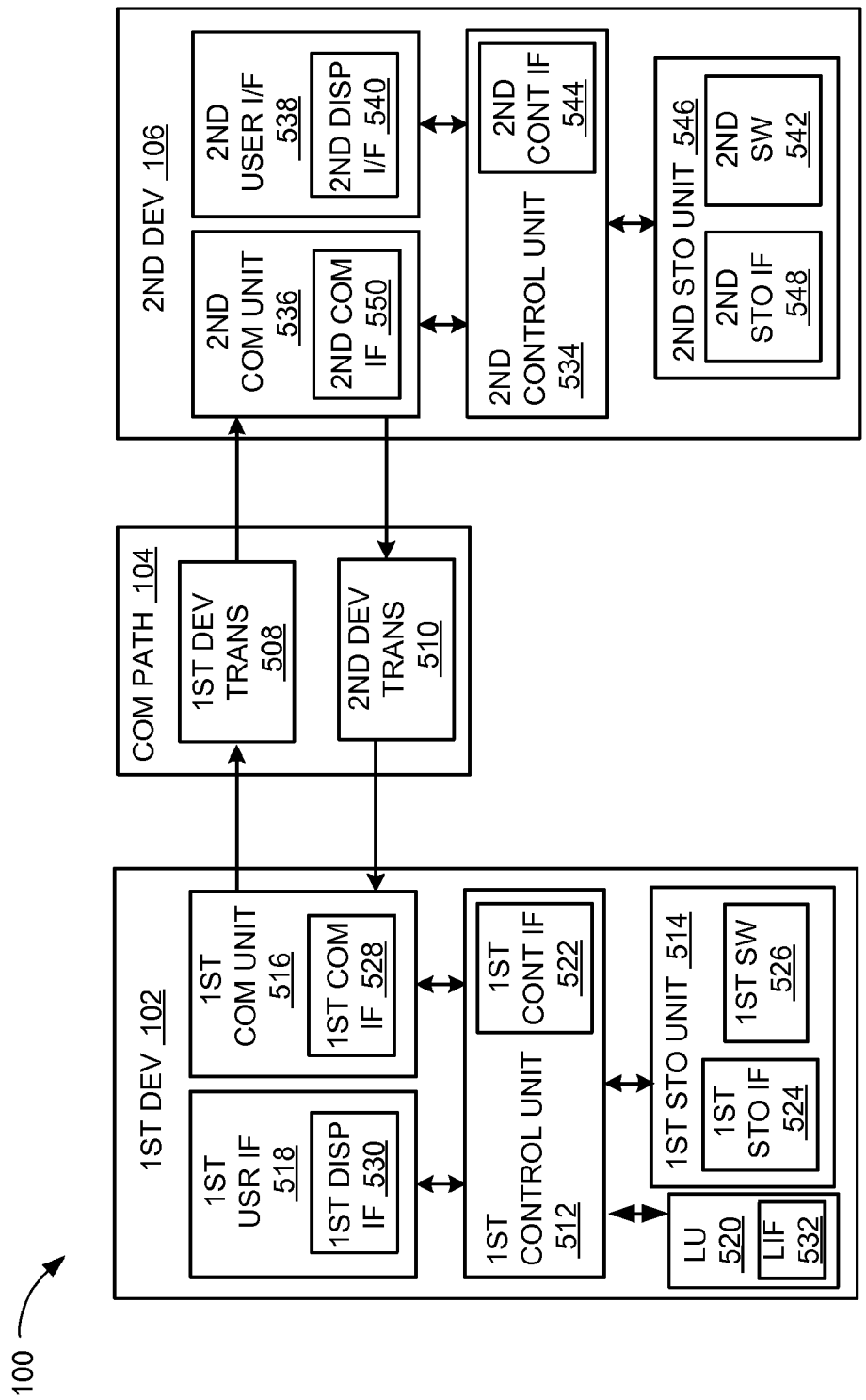
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, a camera, or any combination thereof to provide data and communication inputs.

The first user interface 518 can include a first display interface 530. The first display interface 530 can include a display, a projector, a video screen, a speaker, a headset, or any combination thereof.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, a camera, or any combination thereof to provide data and communication inputs. Examples of the output device of the second user interface 538 can include a second display interface 540. The second display interface 540 can include a display, a projector, a video screen, a speaker, a headset, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
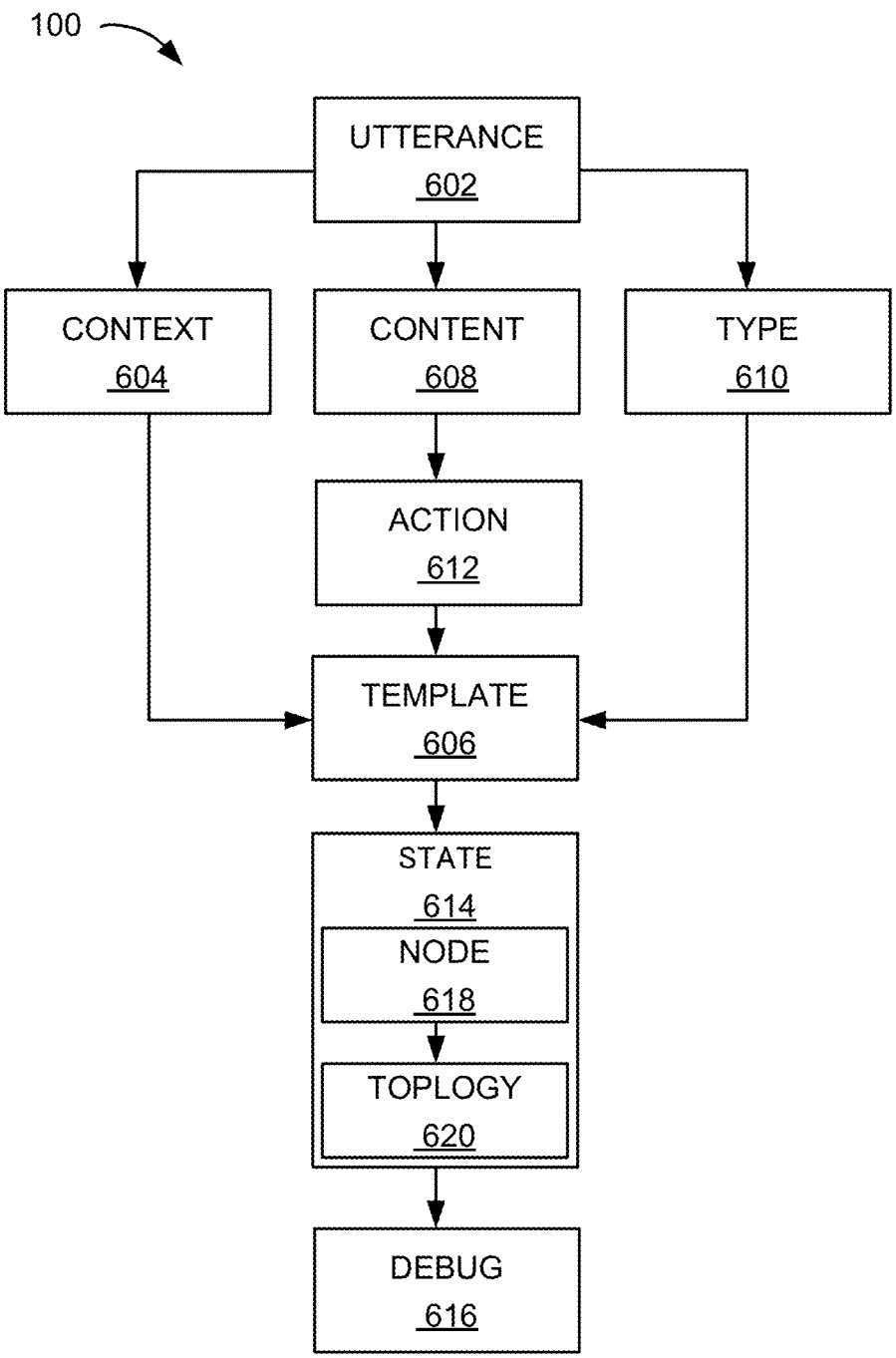
FIG. 6 is a control flow of the navigation system.

Referring now to FIG. 6, therein is shown a control flow of the navigation system 100. The navigation system 100 can include an utterance module 602. The utterance module 602 receives a command input 232 of FIG. 2. For example, the utterance module 602 can receive the command input 232 representing a voice entry from the user of the navigation system 100 requesting navigation information to the category of interest 220 of FIG. 2. The utterance module 602 can send the command input 232 to a context module 604.

The navigation system 100 can include a context module 604, which can couple to the utterance module 602. The context module 604 determines the travel context 204 of FIG. 2. The travel context 204 can include the route condition 206 of FIG. 2 surrounding the first device 102.

The context module 604 can determine the travel context 204 in a number of ways. For example, the route condition 206 can include the start location 208 of FIG. 2 where the travel started from, the destination 210 of FIG. 2 of where the travel will end, the geographic location 212 of FIG. 2, the route type 214 of FIG. 2 where the user is traveling, the traveling time 216 of FIG. 2, or a combination thereof. More specifically, the start location 208 can represent user's home. The destination 210 can represent user's work place. The route type 214 can include local roads and freeway. The geographic location 212 can represent Fremont, Calif. (CA). The traveling time 216 can represent 8 AM. By analyzing the route condition 206 where and when the user with the first device 102 is traveling, the context module 604 can determine the travel context 204 to be that the user of the navigation system 100 is commuting to work.

For another example, the route condition 206 can represent the traffic condition 218 of FIG. 2 on the roads. The context module 604 can determine the traffic condition 218 based on the speed of the vehicle traveling on the road. The speed can represent 6 miles per hour. As a result, the context module 604 can determine the travel context 204 based on the traffic condition 218 to represent that the user is stuck in traffic. The context module 604 can send the travel context 204 to a template module 606.

The navigation system 100 can include a content module 608, which can couple to the utterance module 602. The content module 608 generates the state content 316 of FIG. 3. For example, the content module 608 can generate the state content 316 for generating the state template 322 of FIG. 3. The state content 316 can represent the values for populating the state node 306 of FIG. 3 of the guidance process 302 of FIG. 3. For example, the state content 316 can represent the contact information 226 of FIG. 2 for the category of interest 220, the navigation information to reach the category of interest 220, the location information 228 of FIG. 2 surrounding the first device 102, or a combination thereof. Details regarding the state node 306, the guidance process 302, and state template 322 will be discussed below.

The content module 608 can generate the state content 316 in a number of ways. For example, the content module 608 can generate the state content 316 based on the POI information 224 of FIG. 2 received, via the first control interface 622, from external sources. The POI information 224 can represent Starbucks Coffee™. The POI information 224 can include the contact information 226 and the location information 228, such as the address information and phone number, of Starbucks Coffee™ for the geographic location 212. The content module 608 can generate the state content 316 representing Starbucks Coffee™ to include the POI information 224.

For another example, the POI information 224 can include the traffic condition 218. More specifically, the POI information 224 can represent the traffic condition 218 for the geographic region, the neighborhood, the route type 214, or a combination thereof. The content module 608 can generate the state content 316 for the geographic region based on the travel context 204 by tracking the traffic condition 218 within the geographic region for adjusting the navigation guidance 202 of FIG. 2.

The content module 608 can generate the state content 316 based on organizing the state content 316 into a table, a list, or a combination thereof. More specifically, the content module 608 can organize the state content 316 based on the category of interest 220. For example, the category of interest 220 can represent coffee shop. The content module 608 can generate the state content 316 for the coffee shop by organizing the coffee shop names, such as Starbucks Coffee™, Caribou Coffee™, Peet's Coffee™, in a table.

For another example, the content module 608 can organize the state content 316 based on the action type 318 of FIG. 3. The action type 318 can represent "drive there" for providing the navigation guidance 202 to the destination 210 representing the category of interest 220. The content module 608 can organize the state content 316 based on the action type 318 of "drive there" by creating the list for the category of interest 220 with the address information.

The content module 608 can update the state content 316 by updating the table, the list, or a combination thereof as the POI information 224 received is also updated. Additionally, the content module 608 can update the state content 316 based on the travel context 204. More specifically, the list can include the following values when the user with the first device 102 is in Sunnyvale, Calif.: 1. United States (US) Highway 101, 2. Central Expressway, and 3. Lawrence Expressway. The list can be paired with the index number and the location information 228, such as "1" as the index number and "US Highway 101" as the location information 228. If the travel context 204 changes to San Mateo, Calif., the list can be updated by the content module 608 to include the following values: 1. US Highway 101, 2. US Highway 92, and 3. Interstate Highway 280. The content module 608 can send the state content 316 to the template module 606.

The navigation system 100 can include a type module 610, which can couple to the utterance module 602. The type module 610 determines the guidance type 304 of FIG. 3 of the guidance process 302 to be generated. For example, the type module 610 can determine the guidance type 304 of the state node 306 based on the command input 232.

For a specific example, the type module 610 can determine the guidance type 304 based on analyzing the command input 232 received. The user can make a voice entry by stating "Starbucks" as the command input 232. The type module 610 can analyze the command input 232 by comparing the command input 232 to a list of keywords stored within the first storage unit 514. Based on the comparison, the type module 610 can determine that the user is asking for the category of interest 220 representing a coffee shop. As a result, the type module 610 can determine the guidance type 304 of the guidance process 302 to represent the state machine to search for the category of interest 220 of a coffee shop. The type module 610 can send the guidance type 304 to the template module 606.

The navigation system 100 can include an action module 612, which can couple to the content module 608. The action module 612 generates the action type 318. The action type 318 can represent the action that the user of the navigation system 100 can invoke from the particular instance of the state node 306. For example, the action type 318 can represent the generating the navigation guidance 202, contacting the category of interest 220, returning to the top of menu of the guidance process 302, or a combination thereof. The action module 612 can generate the action type 318 based on the state content 316.

For a specific example, the state content 316 can represent Starbucks Coffee™. The state content 316 can include the contact information 226 and the location information 228, such as the address information and phone number for Starbucks Coffee™. Based on the state content 316 available, the action module 612 can generate the action type 318 for Starbucks Coffee™. More specifically, the action module 612 can generate the action type 318 of "drive there" to reach Starbucks Coffee™ based on the availability of the address information in the state content 316 and the action type 318 of "call them" to contact the store based on the availability of the phone number in the state content 316. The action module 612 can send the action type 318 to the template module 606.

It has been discovered that the navigation system 100 can generate the action type 318 based on the availability of the state content 316 improves the integrity of the guidance process 302. By limiting the generation of the action type 318 to the state content 316 available, the possibility of generating the action type 318 without the state content 316 is eliminated. As a result, the navigation system 100 can generate the guidance process 302 having the action type 318 with the state content 316 for safer operation of the navigation system 100.

The navigation system 100 can include the template module 606, which can couple to the context module 604, the content module 608, the type module 610, the action module 612, or a combination thereof. The template module 606 generates the state template 322. For example, the template module 606 can generate the state template 322 based on the travel context 204, the state content 316, the guidance type 304, the action type 318, or a combination thereof.

The template module 606 can generate the state template 322 in a number of ways. For example, the template module 606 can generate the state template 322 by establishing a hierarchical relationship amongst the instances of the state node 306 and the action type 318 corresponding to the state node 306. Furthermore, the template module 606 can generate the state template 322 using the graph theory to establish relationship between one instance of the state node 306 and another instance of the state node 306. The relationship can represent the logical step from progressing from one instance of the state node 306 to another instance of the state node 306.

For a specific example, the template module 606 can generate the state template 322 for providing information to the user for the category of interest 220. The category of interest 220 can represent Starbucks Coffee™. The template module 606 can generate the state template 322 for Starbucks Coffee™ for the following hierarchical relationship for instances of the state node 306: 1. Ask which city, 2. Receive the command input 232, 3. Starbucks Coffee™ for the city chosen, 5. Ask what action the use wants to take, and 6. Execute the action.

Furthermore, the template module 606 can generate the state template 322 based on the template size 324 of FIG. 3. The template size 324 of the state template 322 can base on the availability of the state content 316 and the action type 318. For example, state content 316 for Starbucks Coffee™ in Mountain View can include the address information and the phone number. The action type 318 available as a result can represent "drive there" and "call them." The template module 606 can generate the state template 322 to include the action type 318 of "drive there" and "call them" in the guidance process 302 for accessing Starbucks Coffee™ in Mountain View. In contrast, phone number for Starbucks Coffee™ in Palo Alto is unavailable. As result, the template module 606 can generate the state template 322 to include the action type 318 of "drive there" and not the action type 318 of "call them" in the guidance process 302 for accessing Starbucks Coffee™ in Palo Alto.

It has been discovered that the navigation system 100 can customize the generation of the state template 322 based on the availability of the state content 316. The customization of the state template 322 improves the efficiency by allocating computation resource necessary for generating the guidance process 302 based on the availability of the state content 316. As a result, the navigation system 100 can reduce the processing power and the memory allocated for generating the guidance process 302, thus, improving the performance of the navigation system 100 for safer operation of the vehicle.

It has been further discovered that the navigation system 100 can customize the generation of the state template 322 for providing accurate information to the user. By tailoring the state template 322 based on the state content 316 available, the navigation system 100 can eliminate the risk of generating the guidance process 302 having unelectable option. As a result, the navigation system 100 can improve the safe operation of the navigation system 100 and vehicle.

The template module 606 can generate multiple instances of the state template 322. More specifically, the template module 606 can generate the state template 322 for each Starbucks Coffee™ in the city of Mountain View, Palo Alto, and Redwood City, examples of cities in California. The template module 606 can send the state template 322 to a state module 614.

The navigation system 100 can include the state module 614, which can couple to the template module 606. The state module 614 generates the guidance process 302. For example, the state module 614 can generate the guidance process 302 based on the state node 306 for presenting the prompt 234 of FIG. 2 on the first device 102. For further example, the state module 614 can generate the guidance process 302 as described in FIG. 3 and FIG. 4.

The state module 614 can include a node module 618. The node module 618 generates the state node 306. For example, the node module 618 can generate the state node 306 based on the command input 232, the guidance type 304, the travel context 204, the state template 322, or a combination thereof. More specifically, the node module 618 can generate the state node 306 based on the travel context 204 for the state node 306 having the state content 316 relevant to the travel context 204. The state node 306 can include the entry node 308 of FIG. 3, the dialog node 310 of FIG. 3, the fallback node 312 of FIG. 3, or a combination thereof.

The node module 618 can generate the state node 306 in a number of ways. For example, the node module 618 can generate the entry node 308 based on the command input 232, the guidance type 304, the travel context 204, the state template 322, or a combination thereof. Continuing from the previous example, the use can be searching for Starbucks Coffee™. The travel context 204 can show that the user is driving in US Highway 101 around Palo Alto, Calif. The user can make the command input 232 by making a voice entry representing "Starbucks" to the first device 102.

As discussed above, the guidance type 304 can be determined as searching for the category of interest 220 of Starbucks Coffee™ based on the command input 232 made. Further, the state template 322 can be generated for providing the navigation guidance 202 for Starbucks Coffee™ as discussed above. Based on the guidance type 304 and the state template 322, the node module 618 can generate the entry node 308 for prompting the user for which city is user interested for finding Starbucks Coffee™.

Further, the node module 618 can refine the prompt 234 offered in the state node 306 based on the travel context 204. As discussed above, the travel context 204 can represent that the user is driving in US highway 101 around Palo Alto, Calif. Further, the user can be interested in Starbucks Coffee™ only within the predefined vicinity 230 of FIG. 2 of 10-mile radius. The predefined vicinity 230 can represent a preset boundary for limiting the search of the POI information 224. The city of Mountain View and Redwood City can be within the predefined vicinity 230 from Palo Alto. Based on the travel context 204 and the predefined vicinity 230, the node module 618 can generate the entry node 308 of the state node 306 with the prompt 234 that limits the selection option by asking which of the three Starbucks Coffee™ in Mountain View, Palo Alto, and Redwood City will the user be interested in. The command input 232 can ask for Starbucks Coffee™ in Mountain View.

The node module 618 can generate the state node 306 representing the dialog node 310 to process the command input 232 after the user responded to the prompt 234 made in the entry node 308. More specifically, the node module 618 can generate the dialog node 310 based on the hierarchical relationship established in the state template 322. In other words, the node module 618 can generate the dialog node 310 for each step in the logical hierarchy as established in the state template 322. For example, the node module 618 can generate the dialog node 310 representing Starbucks Coffee™ for the city chosen. The dialog node 310 can represent Starbucks Coffee™ for the city of Mountain View.

Additionally, the node module 618 can generate the arc 320 of FIG. 3 that corresponds to the action type 318. For example, after generating the dialog node 310 for Starbucks Coffee™ in Mountain View, the node module 618 can generate the arc 320 representing instances of the action type 318 representing "call them" and "drive there." The number of instances of the arc 320 generated by the node module 618 can be based on the state template 322. Moreover, the number of instances of the arc 320 can base on the state content 316 available, thus, incorporated in the state template 322. More specifically, if the address information is available in the state content 316, the state template 322 can include the action type 318 of "drive there" to invoke the navigation guidance 202 for driving to the address.

If the user provides the command input 232 selecting the action type 318 of "call them," the node module 618 can generate the subsequent instance of the dialog node 310 to execute the action of calling the Starbucks Coffee™ in Mountain View. If the user provides the command input 232 selecting the action type 318 of "drive there," the node module 618 can generate the subsequent instance of the dialog node 310 to execute the action of providing the navigation guidance 202 to the Starbucks Coffee™ in Mountain View. However, if the action type 318 is unavailable, the state node 306 can generate the fallback node 312 notifying the user the inability for the navigation system 100 to execute the action requested. For example, the Starbucks Coffee™ in Palo Alto does not provide a phone number. The state template 322 for Palo Alto can include the error message for notifying the user that Starbucks Coffee™ in Palo Alto does not provide a phone number. The fallback node 312 can be connected to the previous instance of the dialog node 310 or the entry node 308 to allow user to retry providing the command input 232. The node module 618 can send the state node 306 to a topology module 620.

The state module 614 can include the topology module 620, which can couple to the node module 618. The topology module 620 generates the guidance process 302. For example, the state module 614 can generate the guidance process 302 based on the state node 306 for presenting the prompt 234 on the first device 102.

The topology module 620 can generate the guidance process 302 by linking a plurality of the state node 306 based on the state template 322. For example, the state template 322 can lay out the topology of the guidance process 322 by laying out the sequence of the entry node 308, the dialog node 310, the fall back node 312, or a combination thereof. The topology module 620 can send the guidance process 322 to a debug module 616.

For illustrative purposes, the navigation system 100 is shown with the template module 606 generating the state template 322, although it is understood that the template module 606 can be operated differently. For example, the template module 606 can generate the packed option 402 of FIG. 4 for providing the state node 306 suited for the travel context 204. For a specific example, the packed option 402 can represent the location information 228 where the category of interest 220 is located, the action type 318 for reaching the geographic location 212, or a combination thereof. Furthermore, unlike the state template 322, which can represent the entire topology of the guidance process 302, the packed option 402 can represent a bundle of parameter that defines the state characteristic 314 of FIG. 3 of one instance of the state node 306. As discussed, the state characteristic 314 can represent the action type 318 and the state content 316 that establishes the state node 306.

More specifically, the template module 606 can generate the packed option 402 by incorporating the possible values and sequence for the state node 306 based on the state content 316, the travel context 204, or a combination thereof. As discussed above, the state content 316 can represent the traffic condition 218 for the geographic region. The traffic condition 218 can represent the traffic accidents in the geographic region of Sunnyvale. The traffic accidents can be reported on the instances of the route type 214 going through Sunnyvale representing US Highway 101, Central Expressway, and Lawrence Expressway. The travel context 204 can represent the user driving in Sunnyvale.

For example, based on the traffic condition 218 and the travel context 204, the template module 606 can generate the packed option 402 having possible navigation choices for the user to select under the travel context 204. For a specific example, the template module 606 can generate the packed option 402 with the action type 318 of "avoiding accident." Additionally, the template module 606 can generate the packed option 402 with the state content 316 representing the navigation choices for avoiding accident for US Highway 101, Central Expressway, or Lawrence Expressway. The template module 606 can update the values of the packed option 402 based on the state content 316, the travel context 204, or a combination thereof updated. The template module 606 can send the packed option 402 to the state module 614.

For illustrative purposes, the navigation system 100 is shown with the state module 614 generating the state node 306 based on the state template 322, although it is understood that the state module 614 can be operated differently. For example, the state module 614 can generate the state node 306 based on the packed option 402 for populating the state content 316 into the state node 306. Unlike the state template 322, which can be utilized to generate multiple instances of the state node 306 to build the entire topology of the guidance process 302, the packed option 402 can be utilized for generating one instance of the state node 306. As a result, the state module 614 can generate one instance of the state node 306 per one instance of the packed option 402.

Continuing from the previous example, the packed option 402 can include the action type 318 of "avoiding accident" and navigation choices for avoiding accident on US Highway 101, Central Expressway, or Lawrence Expressway. The state module 614 can generate the state node 306 based on the populating the state content 316 in the packed option 402 for generating the prompt 234 to provide choices for the user to select. More specifically, the state node 306 can represent the prompt 234 to select the paired index numbers and location information 228 of "1. US Highway 101," "2. Central Expressway," or "3. Lawrence Expressway" with the action type 318 of "avoiding accident."

The state node 306 representing the next logical step in the guidance process 302 can be generated based on the selection made by the user. More specifically, the state module 614 can generate the next instance of the state node 306 based on the packed option 402 appropriate to the command input 232 received, the travel context 204 where the user is situated, or a combination thereof. For example, the user can make the command input 232 to select choice "3" of "Lawrence Expressway." The packed option 402 can be generated with the action type 318 of "return to freeway." Further, the packed option 402 can be generated with the location information 228 of "US Highway 101" and "Interstate Highway 280." Based on the packed option 402, the state module 614 can generate the subsequent instance of the state node 306 with the prompt 234 for having the selection option of "1. US Highway 101" and "2. Interstate Highway 280."

It has been discovered that the navigation system 100 can generate the state node 306 one instance at a time based on the packed option 402. Once the state node 306 is generated, the subsequent instance of the packed option 402 appropriate for the travel context 204 can provide the state content 316 and the action type 318 necessary for generating the subsequent instance of the state node 306. The customization o the state node 306 based on the packed option 402 reduces computational burden from generating the entire topology of the guidance process 302 all at once. As a result, the navigation system 100 can reduce the processing power and the memory allocated for generating the guidance process 302, thus, improving the performance of the navigation system 100 for safer operation of the vehicle.

For illustrative purposes, the navigation system 100 is shown with the topology module 620 generating the guidance process 302 by linking a plurality of the state node 306 based on the state template 322, although it is understood that the topology module 620 can be operated differently. For example, the topology module 620 can generate the guidance process 302 by linking a plurality of the state node 306 based on the packed option 402.

It has been discovered that the navigation system 100 can generate the guidance process 302 based on the packed option 402. By generating the guidance process 302 based on the packed option 402, the topology module 620 can dynamically change the topology of the guidance process 302 on as needed basis based on the travel context 204, the POI 22, or a combination thereof. As a result, efficiency for delivering the navigation guidance 202 based on the guidance process 302 improves for the safer operation of the navigation system 100, the vehicle, or a combination thereof.

The navigation system 100 can include the debug module 616, which can couple to the state module 614. The debug module 616 validates the guidance process 302. For example, the debug module 616 can validate the guidance process 302 by checking whether the guidance process 302 can be executed end-to-end.

The debug module 616 can validate the guidance process 302 in a number of ways. For example, the debug module 616 can validate the guidance process 302 based on the runtime validation 404 of FIG. 4. If the action type 318 can represent "search for Starbucks Coffee™," the debug module 616 can execute the action type 318 for the state node 306 to check whether the invocation of the action type 318 will search for Starbucks Coffee™.

For another example, the debug module 616 can validate the guidance process 302 based on the runtime verification 406 of FIG. 4. For example, the backup arc 410 of FIG. 3 can include the "back" edge, the "help" edge, and the "default" edge. For a specific example, if the navigation system 100 fails to understand the command input 232, the action type 318 for the backup arc 410 of "back" edge can be executed to proceed to the fallback node 312. The debug module 616 can validate the guidance process 302 based on runtime verification 406 based on testing the availability of the backup arc 410.

For a different example, the debug module 616 can validate the guidance process 302 based on the formal verification 408 of FIG. 4. For a specific example, the debug module 616 can validate the guidance process 302 based on the formal verification 408 by checking whether each instances of the state node 306 can be reached as specified in the state template 322.

The physical transformation from traveling from one instance of the travel context 204 to another instance of the travel context 204 results in the movement in the physical world, such as people using the first device 102, the vehicle, or a combination thereof, based on the operation of the navigation system 100. As the movement in the physical world occurs, the movement itself creates additional information that is converted back into the state content 316 for generating the state template 322, the packed option 402, or a combination thereof to generate the guidance process 302 for the continued operation of the navigation system 100 and to continue the movement in the physical world.

The first software 526 of FIG. 5 of the first device 102 of FIG. 5 can include the modules for the navigation system 100. For example, the first software 526 can include the utterance module 602, the context module 604, the content module 608, the type module 610, the action module 612, the template module 606, the state module 614, and the debug module 616.

The first control unit 512 of FIG. 5 can execute the first software 526 for the utterance module 602 to receive the command input 232. The first control unit 512 can execute the first software 526 for the context module 604 to determine the travel context 204. The first control unit 512 can execute the first software 526 for the content module 608 to generate the state content 316. The first control unit 512 can execute the first software 526 for the type module 610 to determine the guidance type 304.

The first control unit 512 can execute the first software 526 for the action module 612 to generate the action type 318. The first control unit 512 can execute the first software 526 for the template module 606 to generate the state template 322. The first control unit 512 can execute the first software 526 for the state module 614 to generate the state node 306, the guidance process 302, or a combination thereof. The first control unit 512 can execute the first software 526 for the debug module 616 to validate the guidance process 302.

The second software 542 of FIG. 5 of the second device 106 of FIG. 5 can include the modules for the navigation system 100. For example, the second software 542 can include the utterance module 602, the context module 604, the content module 608, the type module 610, the action module 612, the template module 606, the state module 614, and the debug module 616.

The second control unit 534 of FIG. 5 can execute the second software 542 for the utterance module 602 to receive the command input 232. The second control unit 534 can execute the second software 542 for the context module 604 to determine the travel context 204. The second control unit 534 can execute the second software 542 for the content module 608 to generate the state content 316. The second control unit 534 can execute the second software 542 for the type module 610 to determine the guidance type 304.

The second control unit 534 can execute the second software 542 for the action module 612 to generate the action type 318. The second control unit 534 can execute the second software 542 for the template module 606 to generate the state template 322. The second control unit 534 can execute the second software 542 for the state module 614 to generate the state node 306, the guidance process 302, or a combination thereof. The second control unit 534 can execute the second software 542 for the debug module 616 to validate the guidance process 302.

The modules of the navigation system 100 can be partitioned between the first software 526 and the second software 542. The second software 542 can include the context module 604, the content module 608, the type module 610, the action module 612, the template module 606, the state module 614, and the debug module 616. The first software 526 can include the utterance module 602.

The navigation system 100 describes the module functions or order as an example. The modules can be partitioned differently. For example, the content module 608 and the context module 604 can be combined. Each of the modules can operate individually and independently of the other modules. Furthermore, data generated in one module can be used by another module without being directly coupled to each other. For example, the state module 614 can receive the command input 232 from the utterance module 602.

It has been discovered that the navigation system 100 can determine the travel context 204 based on the route condition 206 to provide the navigation guidance 202 for improving the safety of the user of the navigation system 100. By generating the state node 306 based on the travel context 204, the navigation system 100 can generate the state node 306 having the state content 316 relevant to the travel context 204. As a result, the navigation system 100 can generate the guidance process 302 with the state content 316 appropriate to the travel context 204 to provide a safer operation of the navigation system 100, the vehicle, or a combination thereof with the prompt 234.

The modules described in this application can be hardware implementation or hardware accelerators in the first control unit 512 or in the second control unit 534. The modules can also be hardware implementation or hardware accelerators within the first device 102 or the second device 106 but outside of the first control unit 512 or the second control unit 534, respectively.

Figure 7:
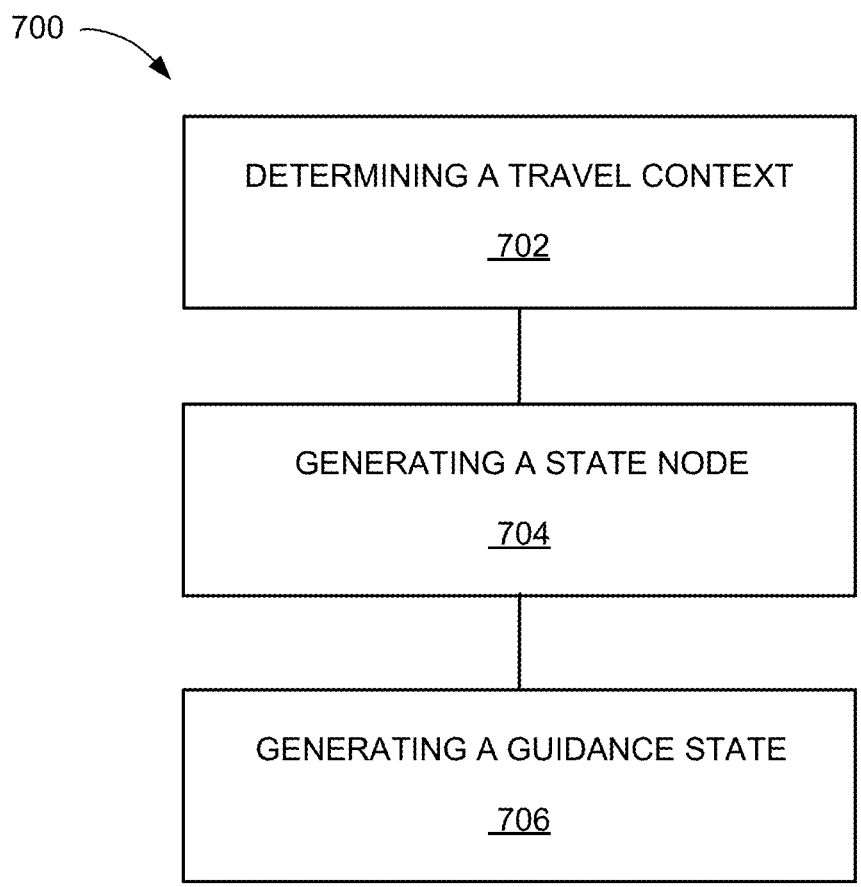
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: determining a travel context based on a route condition for providing a navigation guidance in a block 702; generating a state node having a state content with a control unit based on the travel context in a block 704; and generating a guidance process based on the state node for presenting a prompt on a device in a block 706.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a travel context based on a route condition for providing a navigation guidance;
    generating a state template representing a topology of a guidance process based on an availability of a state content, an action type, or a combination thereof to dynamically customize the state template to change the topology by linking additional instance of a state node on as needed basis according to the travel context;
    generating the state node, representing a state of a state machine, with a control unit based on the travel context, the state template, or a combination thereof; and
    generating the guidance process based on the state node for presenting a prompt on a device.

2. The method as claimed in claim 1 further comprising generating the state content based on the travel context for adjusting the navigation guidance.

3. The method as claimed in claim 1 further comprising generating a packed option based on the travel context for populating the state content for the state node.

4. The method as claimed in claim 1 further comprising generating the state template based on the travel context for providing a navigation guidance.

5. The method as claimed in claim 1 wherein generating the state node includes generating the state node based on a predefined vicinity for providing the prompt appropriate for the travel context.

6. The method as claimed in claim 1 further comprising generating a packed option for providing the state node suited for the travel context.

7. The method as claimed in claim 1 further comprising validating the guidance process based on a runtime validation for checking whether the guidance process is executable from a beginning instance of the state node to an end instance of the state node.

8. The method as claimed in claim 1 further comprising validating the guidance process based on a runtime verification for checking whether a fallback node is available.

9. The method as claimed in claim 1 further comprising validating the guidance process based on a formal verification for checking whether each instances of the state node is reachable as specified in the state template.

10. The method as claimed in claim 1 further comprising organizing the state content based on the action type for providing the navigation guidance to a destination.

11. A navigation system comprising:
    a control unit for:
        determining a travel context based on a route condition for providing a navigation guidance,
        generating a state template representing a topology of a guidance process based on an availability of a state content, an action type, or a combination thereof to dynamically customize the state template to change the topology by linking additional instance of a state node on as needed basis according to the travel context;
        generating the state node, representing a state of a state machine, with a control unit based on the travel context, the state template, or a combination thereof,
        generating the guidance process based on the state node, and
    a communication interface, coupled to the control unit, for transmitting the guidance process for presenting a prompt on a device.

12. The system as claimed in claim 11 wherein the control unit is for generating the state content based on the travel context for adjusting the navigation guidance.

13. The system as claimed in claim 11 wherein the control unit is for generating a packed option based on the travel context for populating the state content for the state node.

14. The system as claimed in claim 11 wherein the control unit is for generating the state template based on the travel context for providing a navigation guidance.

15. The system as claimed in claim 11 wherein the control unit is for generating the state node based on a predefined vicinity for providing the prompt appropriate for the travel context.

16. The system as claimed in claim 11 wherein the control unit is for generating a packed option for providing the state node suited for the travel context.

17. The system as claimed in claim 11 wherein the control unit is for validating the guidance process based on a runtime validation for checking whether the guidance process is executable from a beginning instance of the state node to an end instance of the state node.

18. The system as claimed in claim 11 wherein the control unit is for validating the guidance process based on a runtime verification for checking whether a fallback node is available.

19. The system as claimed in claim 11 wherein the control unit is for validating the guidance process based on a formal verification for checking whether each instances of the state node is reachable as specified in the state template.

20. The system as claimed in claim 11 wherein the control unit is for organizing the state content based on the action type for providing the navigation guidance to a destination.

* * * * *